4. A combination for producing heat by chemical action upon the addition of a suitable ionizing medium, comprising a reactive metal selected from the group consisting of the metals positioned above iron and below the alkali and alkaline earth metals in the electromotive series of metals, an electrolyte the metallic element of which is positioned below iron in the electromotive series of metals, said electrolyte being oxygen-saturated as herein defined, and an alkaline earth metal compound containing available oxygen.

5. A combination for producing heat by chemical action upon the addition of water, comprising aluminum, a salt of a halogen acid containing available oxygen, the metallic element of said salt being non-replaceable by aluminum, and a water-soluble salt of copper, said copper salt being oxygen-saturated as herein defined.

RAYMOND E. REED.

placeable," used in describing the metallic element of these compounds, means that the metallic element of the compound is capable of being replaced from solution by the base metal.

I have also found that highly exothermic compositions may be produced without a replaceable element being present. Of course, when both a replacement reaction and one involving the direct oxidation of the base metal by an acid containing available oxygen are used, the greatest heat generation occurs. However, the heat generated by the latter reaction alone is very substantial and entirely suitable for many uses. The oxidizing acids, or acids containing available oxygen, cannot themselves be incorporated directly into the mixture because of their instability. However, I have found that the desired acid may be introduced into the composition by providing two substances which will interact in the presence of a suitable ionizing medium, such as water, to produce the desired unstable oxidizing agent.

A typical example of a mixture embodying this type of reaction is the following:

| | Grams |
|---|---|
| Aluminum | 10 |
| Sodium chlorate | 5 |
| Oxalic acid | 5 |

When water is added to such a mixture the sodium chlorate and oxalic acid dissolve and are believed to interact to liberate free chloric acid and sodium oxalate. The chloric acid so formed is believed immediately to attack the base metal and form as end products of this reaction aluminum chloride and aluminum hydroxide.

Among suitable substitutes for the sodium chlorate appearing in the above composition may be mentioned the alkali and alkaline earth salts of such acids as chloric, chromic and permanganic. Other salts of these acids, containing copper or other metallic ion replaceable by the base metal, may also be used where very high heat effects are desired.

Among substitutes for the oxalic acid in the above composition, mention may be made of such acid forming electrolytes as tartaric acid, citric acid, potassium acid tartrate, aluminum sulfate and the like.

If it is desired to introduce into the oxidizing acid composition just disclosed, the highly exothermic replacement type of reaction, it is only necessary to select instead of the oxalic acid or other acid electrolytes mentioned, a replaceable acid electrolyte. Among such compounds may be mentioned lead chloride, mercurous chloride, cupric acetate, cuprous chloride, cupric chloride and cupric sulfate. These compounds, it will be noted, are ionizable in water and the metallic ion thus supplied is below iron in the electromotive series of metals. Those compounds (such as cupric acetate and cupric sulfate) which contain oxygen may be referred to as "oxygen-saturated" compounds, i. e., compounds which contain their normal amount of oxygen. In the appended claims the term "oxygen-saturated" is used to denote compounds containing their normal amount of oxygen. A typical example of this type of composition would be the following:

| | Grams |
|---|---|
| Aluminum | 10 |
| Barium chlorate | 8 |
| Lead chloride | 12 |

Upon the addition of water to such a composition, both a replacement and an oxidation reaction of the types previously described takes place.

My novel composition is adapted to a variety of uses, as in heat pads adapted to generate heat upon the addition of water. For example, a pad containing a few grams of my composition, when moistened and wrapped around a coil of hair on a curling iron will generate sufficient heat to raise the temperature of the hair to a suitable point for imparting a permanent wave to the hair.

The foregoing detailed description has been given for clearness of understanding only and no unnecessary limitations should be understood therefrom, but the appended claims should be construed as broadly as possible in view of the prior art.

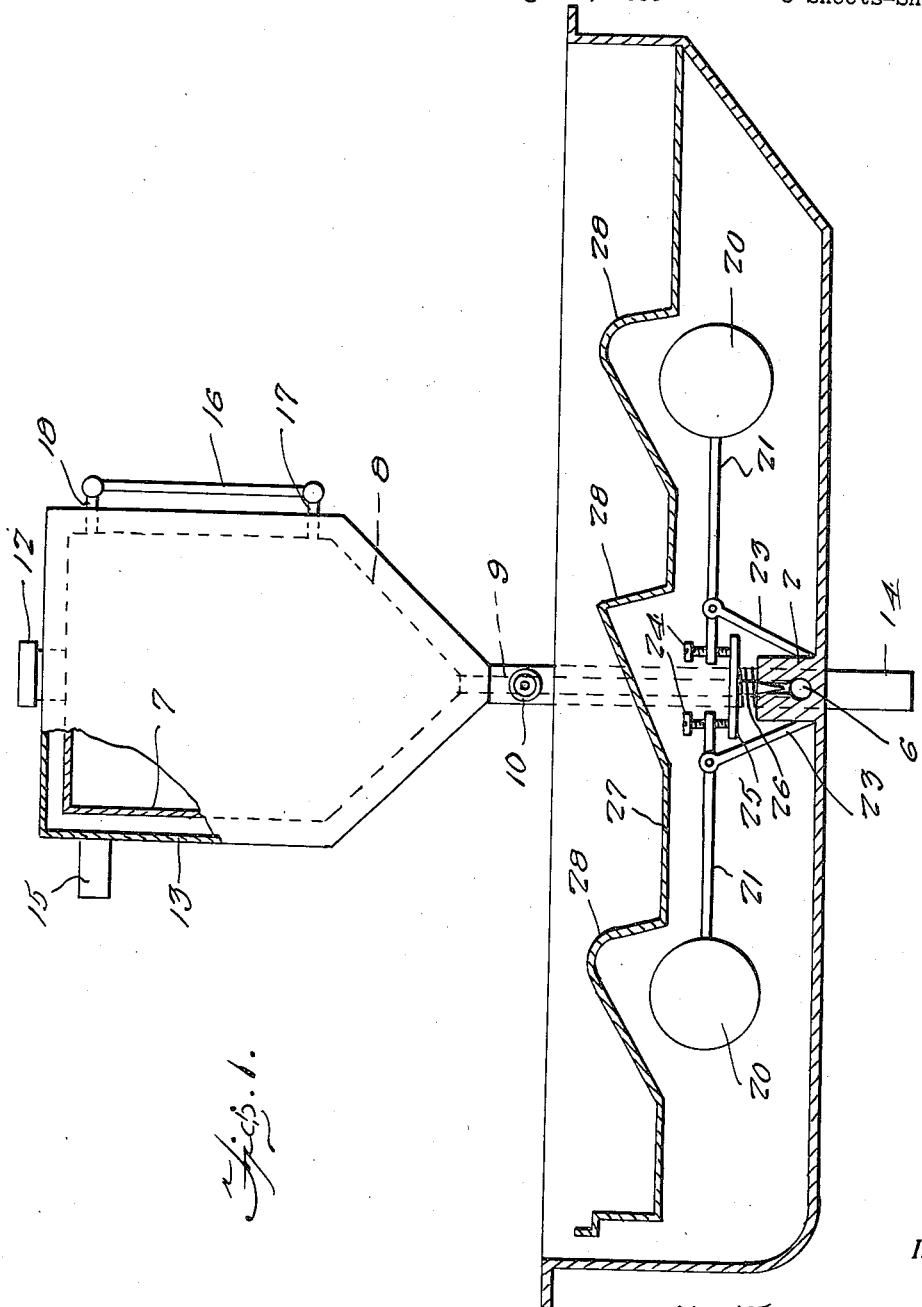

Having thus described my invention, what I claim is:

1. A chemical combination for imparting a permanent wave to hair upon the addition of an ionizing medium thereto, comprising as the base metal a reactive metal selected from the group consisting of the metals positioned above iron and below the alkali and alkaline earth metals in the electromotive series of metals, a salt of a metal positioned below iron in the electromotive series of metals, said salt being ionizable in water and oxygen-saturated as herein defined, and a salt of an oxygen-containing acid, the metallic element of said latter salt being non-replaceable by the base metal and said latter salt being present in quantity sufficient to effect a heating action capable of imparting a permanent wave to hair, with said latter salt serving as the primary source of oxygen to support said action, when said combination is confined in a hair waving pad.

2. A combination for producing heat by chemical action upon the addition of water, comprising as a base metal a reactive metal selected from the group consisting of the metals positioned above iron and below the alkali and alkaline earth metals in the electromotive series of metals, a salt of a metal positioned below iron in the electromotive series of metals, said salt being ionizable in water and oxygen-saturated as herein defined, and an oxygen-containing compound the metallic element of which is positioned above iron in the electromotive series of metals, which latter compound will, in a suitable ionizing medium, generate an acid containing available oxygen in such quantities as to effect a sustained heating action, with said compound serving as a primary source of oxygen to support said action.

3. A combination for producing heat by chemical action upon the addition of water, comprising a reactive metal selected from the group consisting of magnesium, aluminum, manganese and